United States Patent [19]

Lee

[11] Patent Number: 4,685,336

[45] Date of Patent: Aug. 11, 1987

[54] PRESSURE GAUGE

[75] Inventor: Char-Shin Lee, Pa-Cheng Li, Taiwan

[73] Assignee: Lee Wang Industry Ltd., Chiaya, Taiwan

[21] Appl. No.: 835,440

[22] Filed: Feb. 26, 1986

Related U.S. Application Data

[63] Continuation-in-part of Ser. No. 576,032, Feb. 1, 1984, abandoned.

[51] Int. Cl.⁴ .............................................. G01L 7/08
[52] U.S. Cl. .................................................... 73/715
[58] Field of Search ................. 73/715, 716, 711, 744, 73/146.8

[56] References Cited

U.S. PATENT DOCUMENTS

| 1,310,648 | 7/1919 | Clift | 73/711 |
| 3,975,959 | 8/1976 | Larkin | 73/744 |
| 4,040,298 | 8/1977 | Lee et al. | 73/715 |
| 4,347,744 | 9/1982 | Buchanan | 73/715 |

Primary Examiner—Donald O. Woodiel

[57] ABSTRACT

An improved gearless pressure gauge comprises a sensing member, an elastic member flexibly mounted with respect with the sensing member, a seat member carrying a helix capable of moving with the elastic member, and a rotary shaft including a fixed lateral pin laying on the helix which can be rotatably driven thereby responding to the movement of the sensing member under pressure, which in turn imparts through the elastic member and forces the helix to move upwardly, a pointer carried by the rotary shaft thus can give a pressure reading, the rotary shaft can return to its initial position when the pressure on the sensing member is removed by the restoring force of a spiral spring.

16 Claims, 9 Drawing Figures

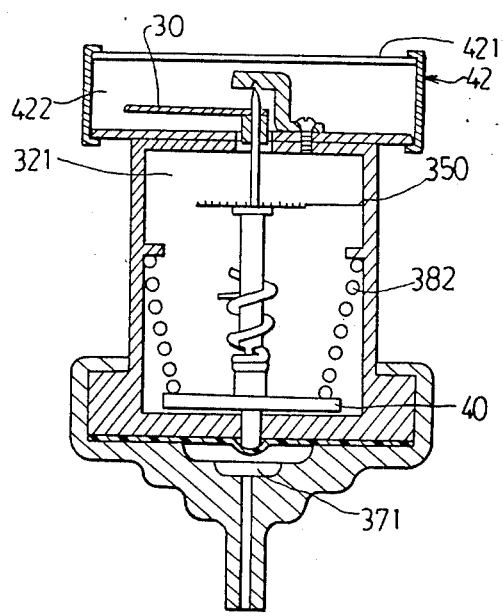
F I G. 7
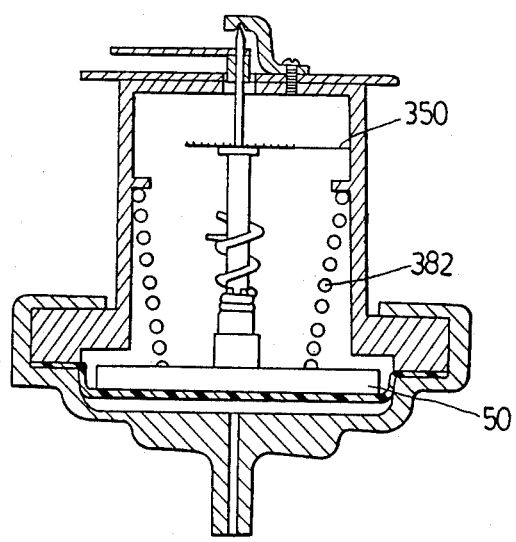
F I G. 8

4,685,336

PRESSURE GAUGE

CROSS REFERENCE TO RELATED APPLICATION

This application is a continuation-in-part of application Ser. No. 576,032 filed Feb. 1, 1984 now abandoned.

BACKGROUND OF THE INVENTION

This invention relates to a pressure gauge and particularly concerns a pressure gauge which can be adapted to measure the fluid pressure over a wide range with a modification of the structure thereof.

Several types of pressure gauges are used to measure the pressure of fluid in many situations. Generally, in the pressure gauge a metallic elements such as a curved tube or a flexible diaphragm is provided as a sensing element which deforms under fluid pressure. The deformation is changed mechanically or electrically into a calibrated dial reading. For example, an important and widely used pressure gauge is the Bourdon-tube pressure gauge (or spring-tube pressure gauge) in which pressure measurement is based on the deformation by the pressure-producing source of an elastic measuring element. The tube of the gauge of circular or oval cross-sectional shape is closed at one end, and the pressure to be measured is applied to the other end, causing the radius of curvature of the tube to increase. The Bourdon tube usually has limited accuracy due to the inherent structure and material generally used. In another respect, many gears are used as sensing members in conventional devices, and such gauges must be checked from time to time over their full range or scale, making use quite inconvenient for a user. Considering the above shortcomings of conventional devices, the inventor thus discloses a pressure gauge under U.S. Pat. No. 4,040,298 granted on Aug. 9, 1977, which includes neither Bourdon tube nor gears, but rather is comprised of a diaphragm sensitive to pressure, a driving helix and a rotary shaft which performs the function of pressure indication. However, to be a sensitive element, the diaphragm has a rather large surface which is not suitable for measuring a low pressure fluid.

SUMMARY OF THE INVENTION

It is a general object of this invention to provide an improved gearless pressure gauge which can be adapted to measure either high or low fluid pressure with a modification of the sensing element.

The nature of the present invention may be stated in general terms as comprising a housing member that includes a sealed chamber and a first chamber adapted to communicate with the fluid; a sensing member mounted in said housing member which can be movable in response to a pressure applied on said one end; a seat member carrying a helix mounted thereon; a rotary shaft including a lateral pin loosely laying on the helix and having one end rotatably mounted on the seat member; a spiral spring providing a restoring force making the rotary shaft rotate to its initial position after being rotated; and an indicating means connected to the rotary shaft and rotatable with the rotary shaft, being adapted to indicate the readings of pressure in the first chamber, characterized in that a resilient diaphragm being attached to the underside of the sensing member to separate a second chamber from the first chamber, which can move to force the sensing member upward under a pressure higher than the atmosphere; an elastic member being flexibly mounted on the sensing member, and the seat member carrying a helix is fixed to the elastic member, the rotary shaft member capable of rotating in accordance with the driving action of the helix due to the movement of the elastic member imparted by the resilient diaphragm and the sensing member under a pressure higher than the atmosphere, with the pin being forced to rotate the shaft in a cam action.

In an aspect of the invention, the elastic member can be an elastomeric diaphragm, or can be a helical spring which has one end biassing against the sensing member and the other end fixed to the housing member.

BRIEF DESCRIPTION OF THE DRAWINGS

The presently preferred exemplary embodiment will be described in detail with respect to the following drawings, in which like numerals designate similar parts throughout the several drawings:

FIG. 7 illustrates an embodiment similar to the one shown in FIG. 3 or FIG. 4 except the diaphragm is replaced by a coil spring and the second chamber is sealed from the atmosphere;

FIG. 8 illustrates an embodiment similar to the one shown in FIG. 3 or FIG. 4 except the diaphragm is replaced by a helical spring.

DETAILED DESCRIPTION OF THE PREFERED EMBODIMENT

Figure 1:
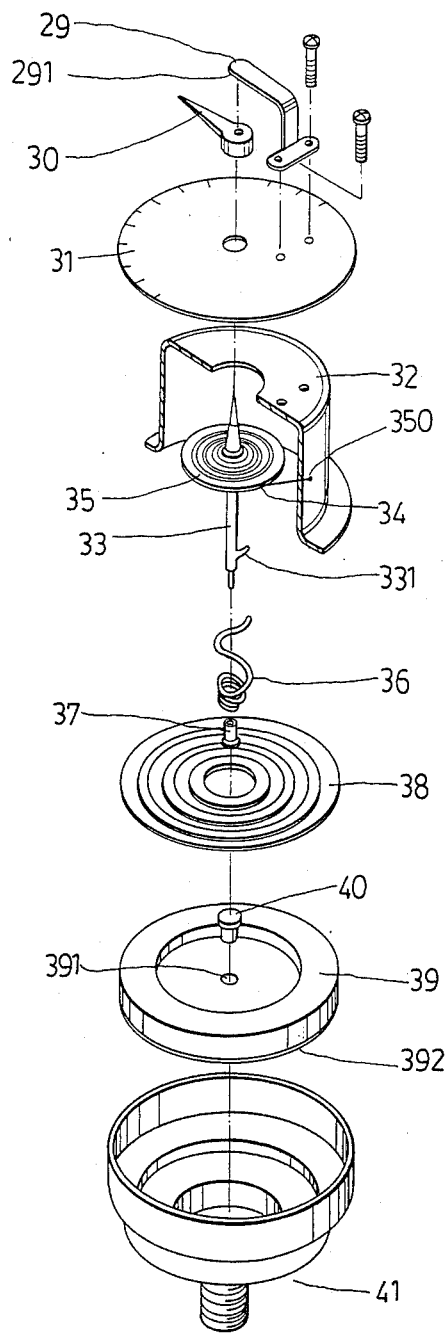
FIG. 1 is an exploded view of an embodiment of the pressure gauge according to this invention, with the upper housing member broken to show the rotary shaft.
Figure 2:
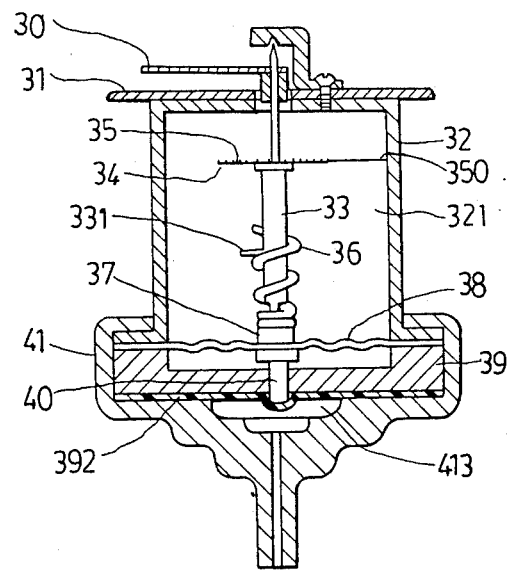
FIG. 2 is a fragmentary section view of the same embodiment as shown in FIG. 1.

Referring now to FIGS. 1 and 2, the pointer 30 is mounted on the rotary shaft 33; the calibrated dial 31 is fixed on the upper housing member 32; a spiral spring 35 is positioned in a supporting frame 34 with one end thereof fixed to a proper point 350 of the upper housing member 32 and having the other end fixed to the rotary shaft 33, a lateral pin 331 of the rotary shaft 33 lays loosely on the helix 36; the seat member 37 as well as helix 36 secured thereon is mounted on the diaphragm 38; the diaphragm 38 is flexibly attached on a base member 39, and the sensing member 40 is slidably mounted on the base member 39.

Referring in detail to FIG. 1 wherein the respective members are shown separated from each other, a first chamber 413 is defined in lower housing 41, which first chamber is in fluid communication with the fluid whose pressure is to be measured. The lower housing 41 and the upper housing 32 also define a second chamber 321 therein. The second chamber may be open to atmosphere as shown in FIG. 2 or sealed as shown in FIG. 7. A pressure above atmospheric applied on a resilient sealing diaphragm 392 will force the sensing member 40 upwardly.

As indicated above, the sensing element in this embodiment is a stud-like movable member 40, which is slidably received in a through hole 391 provided in a base member 39.

As shown in FIG. 2, the flat head of movable member 40 maintains contact with the diaphragm 38. When a fluid flows into the first chamber 413, the pressure of the fluid will be applied to the sensing member 40, causing an upward movement thereof. The seat member 37 as well as the helix 36 will then be also forced upwardly.

The top end of the rotary shaft 33 is pointed and pivotably engagend in a tapered hollow 291 formed in a bracket member 29. A lateral pin 331 is provided on the rotary shaft 33, which lays loosely on the helix 36, in such a way that, when the helix 36 is forced upwardly, the rotary shaft 33 will rotate along a spiral path under the driving of helix 36. The pin 331 slides over a distance proportional to the pressure acting against the movable sensing member 40, and, as a result, the pointer 30 which follows the rotation of the shaft will indicate the accurate pressure readings at the properly calibrated dial 31. Meanwhile, the rotation of rotary shaft 33 causes the spiral spring 35 to store restoring energy in the counterclockwise direction. Once the pressure is released, the movable sensing member 40 will return to its equilibrium position, and the rotary shaft 33 will rotate to its initial position due to the restoring force of the spring 35.

Figure 4:
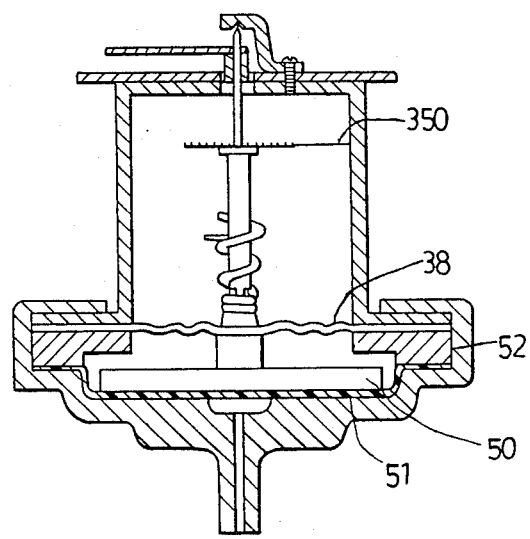
FIG. 4 is a fragmentary section view of the same embodiment as shown in FIG. 3.
Figure 3:
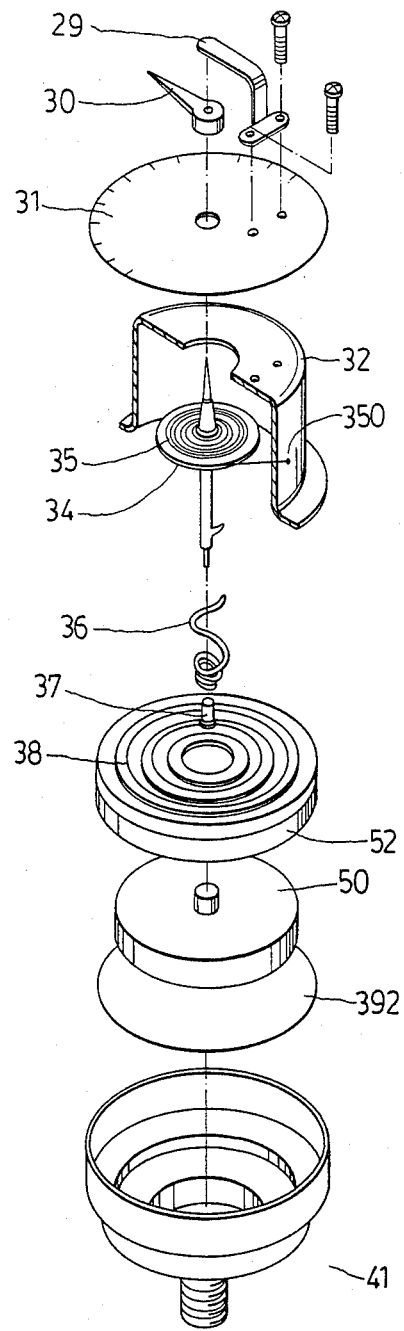
FIG. 3 is an exploded view of another embodiment of the pressure gauge according to this invention.
Figure 5:
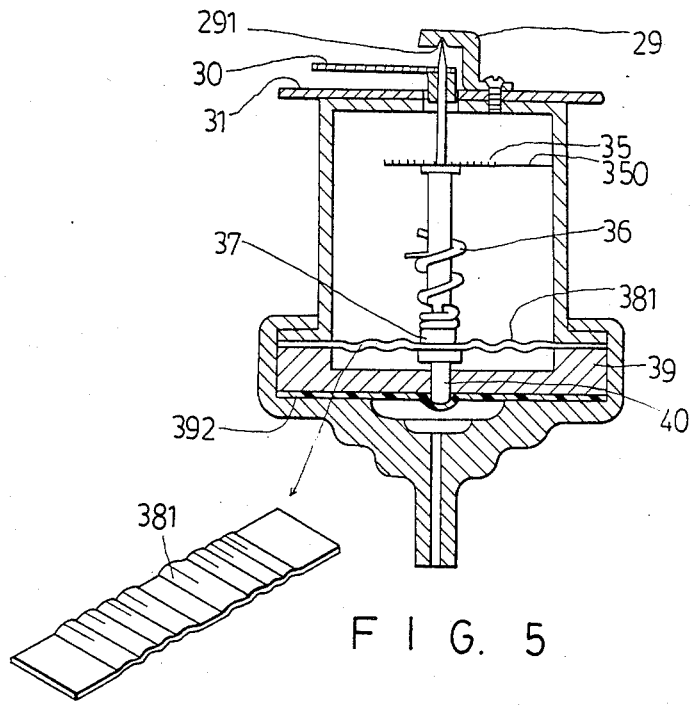
FIG. 5 illustrates an embodient similar to the one shown in FIG. 1 or FIG. 2 except the diaphragm is replaced with a leaf spring.
Figure 6:
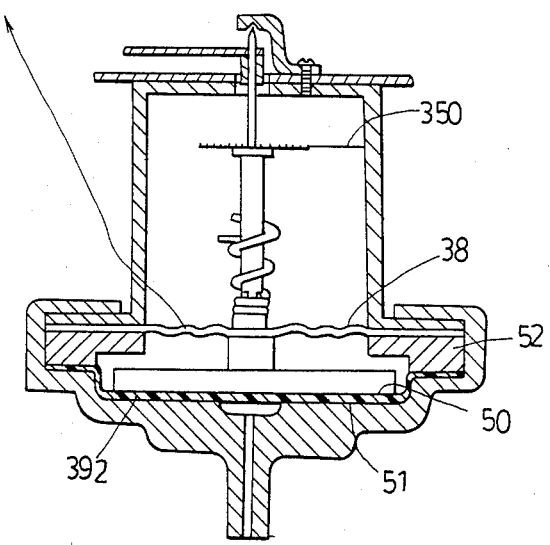
FIG. 6 illustrates an embodiment similar to the one shown in FIG. 3 or FIG. 4 except the diaphragm is replaced by a leaf spring.
Figure 9:
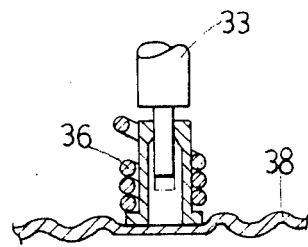
FIG. 9 is a fragmentary section view of the embodiment shown in FIG. 1, illustrating the relative position of the rotary shaft and the seat member.

The pressure gauge of FIGS. 1 and 2 is especially adapted to measure relatively high pressure. A pressudre gauge adapted to measure the fluid of relatively low pressure is shown in FIG. 3 and FIG. 4. The difference between this embodiment and the above mentioned embodiment mainly resides in the configuration of the movable sensing member. In low pressure measuring, the effective acting surface of the pressure on the sensing member should be expanded, thus making it sensitive to the pressure applied thereon.

In the preferred embodiment shown in these two figures, the sensing member 50 is formed as a circular plate which has a much larger diameter and is provided with a protrusion in the center to contact with the diaphragm 38. A ring packing member 52 is disposed to hold against the diaphragm 38.

ln order to improve the sensitivity of the sensing member, a diaphragm 51 sensitive to pressure can be attached to the bottom of the sensing member 50.

In other embodiments, tnhe corrugated diaphragm 38 can be substituted by a corrugated leaf spring 381 or helical spring 382, as respectively shown in FIG. 5, FIG. 6 and FIG. 7, FIG. 8, to bias against the sensing element to achieve the same function.

Generally speaking, the pressure gauges of FIGS. 1–6 and 8 would be provided with a protective cap 40 having a transparent window 421 to protect the pointer 30, but also permitting the pointer 30 and calibrated dial 31 to be viewed. Such a cap is shown in FIG. 7. The cap 40 may be made hermetically sealed so that second chamber 321 and cap chamber 422 form a sealed chamber.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims which scope is to be accorded the broadest interpretation so as to encompass all such modifications and equivalent structures.

I claim:

1. An improved pressure gauge of the type in which a housing member includes a sealed chamber and an open chamber adapted to communicate with the fluid pressure to be measured; a biasing means mounted in said sealed chamber, a seat member movable with said biasing means, a rotary shaft including a lateral pin, one end of said rotary shaft being journaled in said seat member, an indicating means connected to the other end of said rotary shaft and rotatable therewith, a helix surrounding said rotary shaft, said helix being adapted to loosely engage said lateral pin on said rotary shaft, and a spiral spring providing a restoring force making the rotary shaft rotate to its initial position after being rotated, the improvement comprising a flexible member dividing said housing into said sealed chamber and said open chamber, a sensing member mounted in said sealed chamber and carried by said flexible member to be movable in response to a pressure applied thereto, said sensing member being in engagement with said seat member and adapted to move said seat member and helix and cause rotation of said rotary shaft by camming action of said helix upon said lateral pin of said rotary shaft.

2. A pressure gauge according to claim 1, wherein said biasing means is a elastomeric diaphragm.

3. A pressure gauge according to claim 1, wherein said biasing means is a leaf spring.

4. A pressure gauge according to claim 1, wherein said biasing means is a helical spring which has one end biassing against said sensing member and the other end fixed to said housing member.

5. The pressure gauge of claim 1, wherein said gauge is adapted to measure relatively high pressures and wherein the size of said sensing member where it contacts said resilient member is much smaller than the size of said resilient member.

6. The pressure gauge of claim 1, wherein said housing includes a structural member which has an opening therein for movably receiving said sensing member and which is disposed adjacent to said resilient member.

7. The pressure gauge of claim 1, wherein said gauge is adapted to measure relatively low pressures and wherein the size of said sensing member where it contacts said resilient member is nearly as large as said resilient member.

8. The pressure gauge of claim 1, wherein said housing and said sensing members have confronting surfaces which are separated only by said resilient member when said gauge is quiescent.

9. An improved pressure gauge of the type in which a housing member includes first and second chambers, the first chamber adapted to communicate with the fluid pressure to be measured; a biasing means mounted in said second chamber, a seat member movable with said biasing means, a rotary shaft including a lateral pin, one end of said rotary shaft being journaled in said seat member, an indicating means connected to the other end of said rotary shaft and rotatable therewith, a helix surrounding said rotary shaft, said helix being adapted to loosely engage said lateral pin on said rotary shaft, and a spiral spring providing a restoring force making the rotary shaft rotate to its initial position after being rotated, the improvement comprising a flexible member dividing said housing into said first and second chambers, a sensing member mounted in said second chamber and carried by said flexible member to be movable in response to a pressure applied thereto, said sensing member being in engagement with said seat member and adapted to move said seat member and helix and cause rotation of said rotary shaft by camming action of said helix upon said lateral pin of said rotary shaft.

10. The pressure gauge according to claim 9, wherein said biasing means is a elastomeric diaphragm.

11. The pressure gauge according to claim 9, wherein said biasing means is a leaf spring.

12. The pressure gauge according to claim 9, wherein said biasing means is a helical spring which has one end biasing against said sensing member and the other end fixed to said housing member.

13. The pressure gauge of claim 9, wherein said gauge is adapted to measure relatively high pressures and wherein the size of said sensing member where it contacts said resilient member is much smaller than the size of said resilient member.

14. The pressure gauge of claim 13, wherein said housing includes a structural member which has an opening therein for movably receiving said sensing member and which is disposed adjacent to said resilient member.

15. The pressure gauge of claim 9, wherein said gauge is adapted to measure relatively low pressures and wherein the size of said sensing member where it contacts said resilient member is nearly as large as said resilient member.

16. The pressure gauge of claim 15, wherein said housing and said sensing members having confronting surfaces which are separated only by said resilient members when said gauge is quiescent.

* * * * *